(12) United States Patent
Wilson

(10) Patent No.: US 8,050,981 B2
(45) Date of Patent: Nov. 1, 2011

(54) ADMINISTRATIVE NOTES IN NETWORK-BASED COMMERCE FACILITY

(75) Inventor: Michael Wilson, Los Gatos, CA (US)

(73) Assignee: eBay Inc, San Jose, CA (US)

( * ) Notice: Subject to any disclaimer, the term of this patent is extended or adjusted under 35 U.S.C. 154(b) by 0 days.

(21) Appl. No.: 12/833,586

(22) Filed: Jul. 9, 2010

(65) Prior Publication Data

US 2010/0280917 A1 Nov. 4, 2010

Related U.S. Application Data

(63) Continuation of application No. 11/581,893, filed on Oct. 17, 2006, now Pat. No. 7,756,776.

(51) Int. Cl.
*G06Q 40/00* (2006.01)
(52) U.S. Cl. ............. 705/26.1; 705/26.35; 705/26.81; 705/1.1
(58) Field of Classification Search ............ 705/26, 705/26.1, 26.36, 26.81
See application file for complete search history.

(56) References Cited

U.S. PATENT DOCUMENTS

| | | |
|---|---|---|
| 3,573,747 A | 4/1971 | Adams et al. |
| 3,581,072 A | 5/1971 | Nymeyer |
| 4,412,287 A | 10/1983 | Braddock, III |
| 4,674,044 A | 6/1987 | Kalmus et al. |
| 4,677,552 A | 6/1987 | Sibley, Jr. |
| 4,789,928 A | 12/1988 | Fujisaki |
| 4,799,156 A | 1/1989 | Shavit et al. |
| 4,823,265 A | 4/1989 | Nelson |
| 4,864,516 A | 9/1989 | Gaither et al. |
| 4,903,201 A | 2/1990 | Wagner |
| 5,063,507 A | 11/1991 | Lindsey et al. |
| 5,077,665 A | 12/1991 | Silverman et al. |
| 5,101,353 A | 3/1992 | Lupien et al. |
| 5,136,501 A | 8/1992 | Silverman et al. |
| 5,168,446 A | 12/1992 | Wiseman |
| 5,205,200 A | 4/1993 | Wright |
| 5,230,051 A | 7/1993 | Quan |
| 5,243,515 A | 9/1993 | Lee |
| 5,258,908 A | 11/1993 | Hartheimer et al. |
| 5,280,422 A | 1/1994 | Moe et al. |
| 5,297,031 A | 3/1994 | Gutterman et al. |
| 5,297,032 A | 3/1994 | Trojan et al. |
| 5,305,200 A | 4/1994 | Hartheimer et al. |
| 5,325,297 A | 6/1994 | Bird et al. |
| 5,329,589 A | 7/1994 | Fraser et al. |
| 5,375,055 A | 12/1994 | Togher et al. |

(Continued)

FOREIGN PATENT DOCUMENTS

CA 2253543 A1 3/1997

(Continued)

OTHER PUBLICATIONS

"U.S. Appl. No. 09/747,204, Advisory Action mailed May 24, 2005", 3 pgs.

(Continued)

*Primary Examiner* — Jagdish Patel
(74) *Attorney, Agent, or Firm* — Schwegman, Lundberg & Woessner, P.A.

(57) ABSTRACT

Some embodiments provide a method and a system for receiving selection of a plurality of entities in the network-based facility from an administrator, receiving selection of an action from the administrator, and applying the selected action to each entity in the plurality of entities.

21 Claims, 16 Drawing Sheets

U.S. PATENT DOCUMENTS

| | | | |
|---|---|---|---|
| 5,394,324 A | 2/1995 | Clearwater |
| 5,426,281 A | 6/1995 | Abecassis |
| 5,485,510 A | 1/1996 | Colbert |
| 5,553,145 A | 9/1996 | Micali |
| 5,557,728 A | 9/1996 | Garrett et al. |
| 5,596,994 A | 1/1997 | Bro |
| 5,598,557 A | 1/1997 | Doner et al. |
| 5,640,569 A | 6/1997 | Miller et al. |
| 5,657,389 A | 8/1997 | Houvener |
| 5,664,115 A | 9/1997 | Fraser |
| 5,689,652 A | 11/1997 | Lupien et al. |
| 5,694,546 A | 12/1997 | Reisman |
| 5,706,457 A | 1/1998 | Dwyer et al. |
| 5,710,889 A | 1/1998 | Clark et al. |
| 5,715,314 A | 2/1998 | Payne et al. |
| 5,715,402 A | 2/1998 | Popolo |
| 5,717,989 A | 2/1998 | Tozzoli et al. |
| 5,722,418 A | 3/1998 | Bro |
| 5,727,165 A | 3/1998 | Ordish et al. |
| 5,771,291 A | 6/1998 | Newton et al. |
| 5,771,380 A | 6/1998 | Tanaka et al. |
| 5,790,790 A | 8/1998 | Smith et al. |
| 5,794,219 A | 8/1998 | Brown |
| 5,799,285 A | 8/1998 | Klingman |
| 5,803,500 A | 9/1998 | Mossberg |
| 5,818,914 A | 10/1998 | Fujisaki |
| 5,826,244 A | 10/1998 | Huberman |
| 5,835,896 A | 11/1998 | Fisher et al. |
| 5,845,265 A | 12/1998 | Woolston |
| 5,845,266 A | 12/1998 | Lupien et al. |
| 5,850,442 A | 12/1998 | Muftic |
| 5,872,848 A | 2/1999 | Romney et al. |
| 5,873,069 A | 2/1999 | Reuhl et al. |
| 5,874,412 A | 2/1999 | Priebe et al. |
| 5,884,056 A | 3/1999 | Steele |
| 5,890,138 A | 3/1999 | Godin et al. |
| 5,905,974 A | 5/1999 | Fraser et al. |
| 5,905,975 A | 5/1999 | Ausubel |
| 5,922,074 A | 7/1999 | Richard et al. |
| 5,924,072 A | 7/1999 | Havens |
| 5,926,794 A | 7/1999 | Fethe |
| 5,991,739 A | 11/1999 | Cupps et al. |
| 6,012,045 A | 1/2000 | Barzilai et al. |
| 6,035,402 A | 3/2000 | Vaeth et al. |
| 6,044,363 A | 3/2000 | Mori et al. |
| 6,047,264 A | 4/2000 | Fisher et al. |
| 6,055,518 A | 4/2000 | Franklin et al. |
| 6,058,417 A | 5/2000 | Hess et al. |
| 6,061,448 A | 5/2000 | Smith et al. |
| 6,073,117 A | 6/2000 | Oyanagi et al. |
| 6,085,176 A | 7/2000 | Woolston |
| 6,104,815 A | 8/2000 | Alcorn et al. |
| 6,119,137 A | 9/2000 | Smith et al. |
| 6,178,408 B1 | 1/2001 | Copple et al. |
| 6,192,407 B1 | 2/2001 | Smith et al. |
| 6,202,051 B1 | 3/2001 | Woolston |
| 6,243,691 B1 | 6/2001 | Fisher et al. |
| 6,285,989 B1 | 9/2001 | Shoham |
| 6,415,269 B1 | 7/2002 | Dinwoodie |
| 6,449,601 B1 | 9/2002 | Friedland et al. |
| 6,515,681 B1 | 2/2003 | Knight |
| 6,560,580 B1 | 5/2003 | Fraser et al. |
| 6,609,112 B1 | 8/2003 | Boarman et al. |
| 7,149,718 B1 | 12/2006 | Wilson |
| 7,756,776 B2 | 7/2010 | Wilson |
| 2007/0055681 A1 | 3/2007 | Wilson |

FOREIGN PATENT DOCUMENTS

| | | |
|---|---|---|
| FR | 2658635 | 8/1991 |
| NL | 9300266 | 2/1993 |
| WO | WO-9215174 A1 | 9/1992 |
| WO | WO-9517711 A1 | 6/1995 |
| WO | WO-9634356 A1 | 10/1996 |
| WO | WO-9737315 A1 | 10/1997 |
| WO | WO-9963461 A1 | 12/1999 |

OTHER PUBLICATIONS

"U.S. Appl. No. 09/747,204, Advisory Action mailed Oct. 16, 2003", 2 pgs.

"U.S. Appl. No. 09/747,204, Final Office Action mailed Feb. 23, 2005", 9 pgs.

"U.S. Appl. No. 09/747,204, Final Office Action mailed Jul. 16, 2003", 6 pgs.

"U.S. Appl. No. 09/747,204, Non Final Office Action mailed Jan. 31, 2003", 5 pgs.

"U.S. Appl. No. 09/747,204, Non Final Office Action mailed Jun. 9, 2004", 16 pgs.

"U.S. Appl. No. 09/747,204, Non Final Office Action mailed Aug. 15, 2005", 15 pgs.

"U.S. Appl. No. 09/747,204, Non Final Office Action mailed Dec. 12, 2003", 6 pgs.

"U.S. Appl. No. 09/747,204, Notice of Allowance Jul. 24, 2006", 7 pgs.

"U.S. Appl. No. 09/747,204, Response filed Mar. 12, 2004 to Non Final Office Action mailed Dec. 12, 2003", 17 pgs.

"U.S. Appl. No. 09/747,204, Response filed Apr. 25, 2005 to Final Office Action mailed Feb. 23, 2005", 17 pgs.

"U.S. Appl. No. 09/747,204, Response filed Apr. 30, 2003 to Non Final Office Action mailed Jan. 31, 2003", 19 pgs.

"U.S. Appl. No. 09/747,204, Response filed Oct. 8, 2003 to Final Office Action mailed Jul. 16, 2003", 16 pgs.

"U.S. Appl. No. 09/747,204, Response filed Nov. 9, 2004 to Non Final Office Action mailed Jun. 9, 2004", 17 pgs.

"U.S. Appl. No. 09/747,204, Response filed Dec. 15, 2005 to Non Final Office Action mailed Jun. 15, 2005", 25 pgs.

"U.S. Appl. No. 11/581,893, Final Office Action mailed Jul. 23, 2009", 17 pgs.

"U.S. Appl. No. 11/581,893, Notice of Allowance mailed Mar. 2, 2010", 9 pgs.

"U.S. Appl. No. 11/581,893, Response filed Apr. 24, 2009 to Restriction Requirement mailed Feb. 26, 2009", 9 pgs.

"U.S. Appl. No. 11/581,893, Response filed Nov. 23, 2009 to Non Final Office Action mailed Jul. 23, 2009", 14 pgs.

"U.S. Appl. No. 11/581,893, Restriction Requirement mailed Feb. 26, 2009", 9 pgs.

"Onsale Joins Fray as Online Shopping Picks Up Speed: Internet Booms", *Computer Reseller News*, CMP Publications, Inc., USA, (Jun. 5, 1995), 1 pg.

"Onsale: Onsale Brings Thrill of Auctions and Bargain Hunting Online; Unique Internet retail service debuts with week-long charity auction for The Computer Museum in Boston", *Business Wire*, Dialog Web. 0489267 BW0022, (May 24, 1995), 3 pages.

Baumann, G. W, "Personal Optimized Decision/Transaction Program"*IBM Technical Disclosure Bulletin*, (Jan. 1995), 83-84.

Clemons, E, "Evaluating the prospects for alternative electronic securities", *Proceedings of ICIS 91: 12th International Conference on Information Systems*, (Dec. 16-18, 1991), 53-61.

Graham, I, "The Emergence of Linked Fish Markets in Europe", *Focus Theme*, 1-3.

Hauser, R, "Anonymous Delivery of Goods in Electronic Commerce", *IBM Technical Disclosure Bulletin*, 39(3),(Mar. 1996), 363-366.

Hess, C M, et al., "Computerized Loan Organization System: An Industry Case Study of the Electronic Markets Hypothesis", *MIS Quarterly*, vol. 18 (3), (Sep. 1994), 251-274.

Klein, S, "Introduction to Electronic Auctions", *Focus Theme*, 1-4.

Lee, H G, "AUCNET; Electronic Intermediary for Used-Car Transactions" *Focus Theme*, 1-5.

Lee, H. G, "Eiectronic brokerage and electronic auction: the impact of IT on market structures", *Proceedings of the Twenty-Ninth Hawaii International Conference on System Sciences*, vol. 4, (1996), 397-406.

Malone, T., et al., "Electronic Markets and Electronic Hierarchies", *Communications of the ACM*, (Jun. 1987), vol. 14, Issue 25.

Mardesich, JODI, "Site Offers Clearance for End-of-Life Products—Onsale Takes Auction Gavel Electronic", *Computer Reseller News*, (Jul. 8, 1996), 2 pps.

Massimb, Marcel, "Electronic Trading, Market Structure and Liquidity" *Financial Analysts Journal*, 50(1). (Jan./Feb. 1994), 39-50.

Meade, J., "Visual 360: A Performance Appraisal System Society That's 'Fun'", *HR Magazine*, Society for Human Resource Management., (Jul. 1999), 3 pages.

Neo, B S, "The implementation of an electronic market for pig trading in Singapore", *Journal of Strategic Information Systems*: vol. 1(5), (Dec. 1992), 278-288.

Post, D L, et al., "Application of auctions as a pricing mechanism for the interchange of electric power", *IEEE Transactions on Power Systems*, 10(3), (Aug. 1995), 1580-1584.

Preist, Chris, et al., "Adaptive Agents in a Persistent Shout Double Auction", *International Conference on Information and Computation Economies, Proceedings of the first international conference on Information and computation economies*, (1999), 11-18.

Reck, M., "Formally Specifying an Automated Trade Execution System", *The Journal of Systems and Software*, 1993, Elsevier Science Publishing, USA, (1993), 245-252.

Reck, Martin, "Trading-Process Characteristics of Electronic Auctions", *Focus Theme*, 1-7.

Resnick, Paul, "Reputation systems", *Communications of the ACM*, 43(12), (Dec. 2000), 45-48.

Rockoff, T E, et al., "Design of an Internet-based system for remote Dutch auctions", *Internet Research: Electronic Networking Applications and Policy*, vol, 5(4), (Jan. 1, 1995), 10-16.

Schmid, B F, "The Development of Electronic Commerce", *EM—Electronic Markets*, No.9-10, (Oct. 1993), 2 pgs.

Siegmann, Ken, "Nowhere to go but up", *PC Week*; vol. 12(42), Ziff-Davis Publishing Company, (Oct. 23, 1995), 1-3.

Tjostheim, Ingvar, "A case study of an on-line auction for the World Wide Web", *Norwegian Computing Center (NR)*, 1-10.

Turban, E, "Auctions and Bidding on the Internet: An Assessment", *Focus Theme*, 1-5.

Van Heck, E., et al., "Experiences with Electronic Auctions in the Dutch Flower Industry", *Focus Theme, Erasmus University*, The Netherlands, 6 pgs.

Warbelow, A, et al., "Aucnet: TV Auction Network System", *Harvard Business School Case/Study*, HBVR#9-190-001, USA, (Jul. 1989), 1-15.

Zwass, V., "Electronic Commerce: Structures and Issues", *International Journal of Electronic Commerce*, Fall 1996, vol. 1, No. 1, 3-23.

User Functions

Find Users:

| Search string: | bubba0 | |

(122 points to the input field)

Search Criteria?

- ◉ Exact userid/email match
- ○ Account Id Search (include E if necessary)

[ search ]

User search returned 1 match!

| Userid / Email | Account | Auctins | Bids | All | Alias | Actions | Top Seller |
|---|---|---|---|---|---|---|---|
| ⊛ bubba0/ bubba1@worldnet.att.net (*suspended*) CC E2551747 | 0.00 | auctions | bids | all | History | Reinstate | No |
| Eric (Bubba) Willard, PO Box 34, South Windham, CT, United States, 06266-0034 (Primary) (860) 456-9999, (Secondary) Work Phone: (860) 423-7999, (Fax) N/A, (Host) 12.79.37.215 ||||||||
| UV Rating = 13 ||||||||

| Areacode exists? | Yes | Areacode in State? | Yes | Areacode in City? | Yes |
|---|---|---|---|---|---|
| Zip exists? | Yes | Zip in State? | Yes | Zip in City? | Yes |
| City exists? | Yes | City in State? | Yes | Zip *near* Areacode? | Yes |
| Phone not 555? | Yes | >=10 digit Phone? | Yes | | |

FIG. 7

Reinstate a Member

Use this form to Reinstate a member. An email will be sent, the member reinstated, and a note filed.

| User ID / Password | [_____130_____] | [_____132_____] |
|---|---|---|
| | User ID or E-mail address | Password |
| User to Reinstate: | bubba0 — 134 | |
| | User ID or E-mail address | |
| Warning reason: | Reinstated ▼ | |
| eNote text: (HTML ok) | [ 136 ] | |
| | (required) | 140 |

Press [ Reinstate ] — 142 to Reinstate this user
Press [ clear form ] to start over.
       144

Show Notes

Use this form to to view Notes. Enter *your* User ID and Password, fill in the "About filter" and/or choose an Note category, and hit "Submit" to show eNotes.

*Caution!* If you don't provide a filter, then *all* Notes will be retrieved! you don't want to do that!

| Your User ID / Password | User ID or E-mail address | Password |
|---|---|---|
| About filter | bubba0 ~150 <br> User ID, E-mail address, or item number. Leave blank for all notes. | |
| Note category filter | All ▽ <br> Choose a category or All for all notes ~152 | |

Press [ Submit ] ~154 to see Notes
Press [ clear form ] to start over.

End a member's auction(s)

Use this form to end a member's auction(s) When you're done the auction(s) will be ended, the fee(s) credited (if so chosen), the seller, high bidders, and "buddy" emailed (if applicable), and a note filed.

| User ID / Password | User ID or E-mail address | Password |
|---|---|---|
| Auction(s) to End: | Enter item #s, seperated by spaces. | |
| User Suspended? | ○ Yes ● No  Has the user been suspended? | |
| Credit fees? | ○ Yes ● No  Credit all fees? (this will credit the seller for insertion, bold, featured, etc fees) | |
| eMail Bidders? | ● Yes ○ No  eMail Bidders? (this will e-Mail all bidders for the ended auction) | |
| Why is this auction being closed? | Dutch Auction Choice ▽ | |
| Copyright Buddy | None ▽ | |
| eNote Text (HTML ok) | (required) | |

FIG. 11B

**End *all* of a member's auctions**

Use this form to end *all* of a member's auction. When you're done the auction(s) will be ended, the fee(s) credited (if so chosen), the seller, high bidders, and "buddy" emailed (if applicable), and a note filed.

Note that all of the auctions will be ended for the same reason: "Choice Auction", "High Shipping Charges", etc. You will be allowed to change the *template* for the e-mails sent out to the seller, high bidder(s), and buddy (if applicable).

| User ID / Password | [User ID or E-mail address] [Password] |
|---|---|
| Seller UserId/E-Mail | User ID or e-mail address of user whose auctions are to be ended. |
| User Suspended? | ○ Yes  ● No  <br> Has the user been suspended? |
| Credit fees? | ○ Yes  ● No  <br> Credit all fees? (this will credit the seller for insertion, bold, featured, etc fees) |
| eMail Bidders? | ● Yes  ○ No  <br> eMail Bidders? (this will e-Mail all bidders for the ended auction) |
| Why is this auction being closed? | [Dutch Auction Choice ▼] |
| Copyright Buddy | [None ▼] |
| eNote Text (HTML ok) | (required) |

FIG. 11C

Reinstate Auction

Use this form to Reinstate an auction. An email will be sent, the auction reinstated, and a note filed.

| User ID / Password | User ID or E-mail address | Password |
| --- | --- | --- |
| Auction to Reinstate | Item number | |
| Reinstatement reason: | Blocked Item Reviewed - Approved for Reinstatement ▼ | |
| Note Text (HTML ok) | (required) | |

Press [ Submit ] to Reinstate this Auction
Press [ clear form ] to start over.

FIG. 11D

Appeal Denied

Use this form to file a Blocked Item Appeal Denied Note.

| | | |
|---|---|---|
| User ID / Password | User ID or E-mail address | Password |
| Blocked Item | Item number | |
| Appeal Denied reason: | Blocked Item Appeal Denied ▼ | |
| eNote Text (HTML ok) | (required) | |

Press [Submit] to file a Blocked Item Appeal Denied Note.
Press [clear form] to start over.

ADMINISTRATIVE NOTES IN NETWORK-BASED COMMERCE FACILITY

RELATED APPLICATIONS

The present application is a continuation of U.S. patent application Ser. No. 11/581,893 filed Oct. 17, 2006 now U.S. Pat. No. 7,756,776, which claims priority from U.S. patent application Ser. No. 09/747,204 filed Dec. 21, 2000, which claims priority from U.S. Provisional Application Ser. No. 60/171,821 filed Dec. 21, 1999 and from U.S. Provisional Application Ser. No. 60/178,122 filed Jan. 26, 2000, which applications are herein incorporated by reference.

FIELD OF THE INVENTION

The present invention relates generally to the field of database administration and, more specifically, to a method of creating and communicating notes concerning an auction participant or item within a network-based auction facility.

BACKGROUND OF THE INVENTION

The administration of a Web site, and specifically a commerce Web site, often demands that information concerning a user of tools and facilities provided by the Web site be communicated between various administrative personnel. It is important that the delivery mechanism for such information be reliable and up-to-date, as the failure to communicate information, or the miscommunication of information, may have very serious consequences for a commerce Web site.

While e-mail provides one mechanism commonly used for communications between administrative personnel, e-mail may not be a desirable solution due to the variety of the e-mail clients that may be employed by administrative personnel and problems with e-mail delivery.

Further, e-mail does not provide persistent or "sticky" information concerning an event concerning a user or item transacted via a commerce Web site.

BRIEF DESCRIPTION OF THE DRAWINGS

The present invention is illustrated by way of example and not limitation in the figures of the accompanying drawings, in which like references indicate similar elements and in which:

FIG. 6 illustrates an exemplary embodiment of an HTML page generated by a note search UI.

FIG. 7 illustrates an exemplary embodiment of an HTML page generated by the note search UI that provides certain information regarding a participant located by a search string (e.g., a user).

FIG. 8 illustrates an exemplary embodiment of an HTML page generated by a creation UI that allows a user, or administrator, to reinstate a user of an auction facility following a suspension.

FIG. 9 illustrates a further exemplary embodiment of an HTML page generated by a note search UI that allows a user to perform a search specifically for notes regarding a participant or item of the auction facility.

FIGS. 11A-11E show various exemplary UI's, in the form of HTML or other mark-up language pages, that may be presented to an administrator in the performance of an administrative function.

DETAILED DESCRIPTION

A method and system for communicating information within a network-based auction facility are described. In the following description, for purposes of explanation, numerous specific details are set forth in order to provide a thorough understanding of the present invention. It will be evident, however, to one skilled in the art that the present invention may be practiced without these specific details.

For the purposes of the present specification, the term "note" shall be taken to refer to any textual or graphic description, comment or communication. The term "participant" shall be taken to refer to any entity, human or automated, that contributes to, or participates in, a transaction, communication or process.

Figure 1:
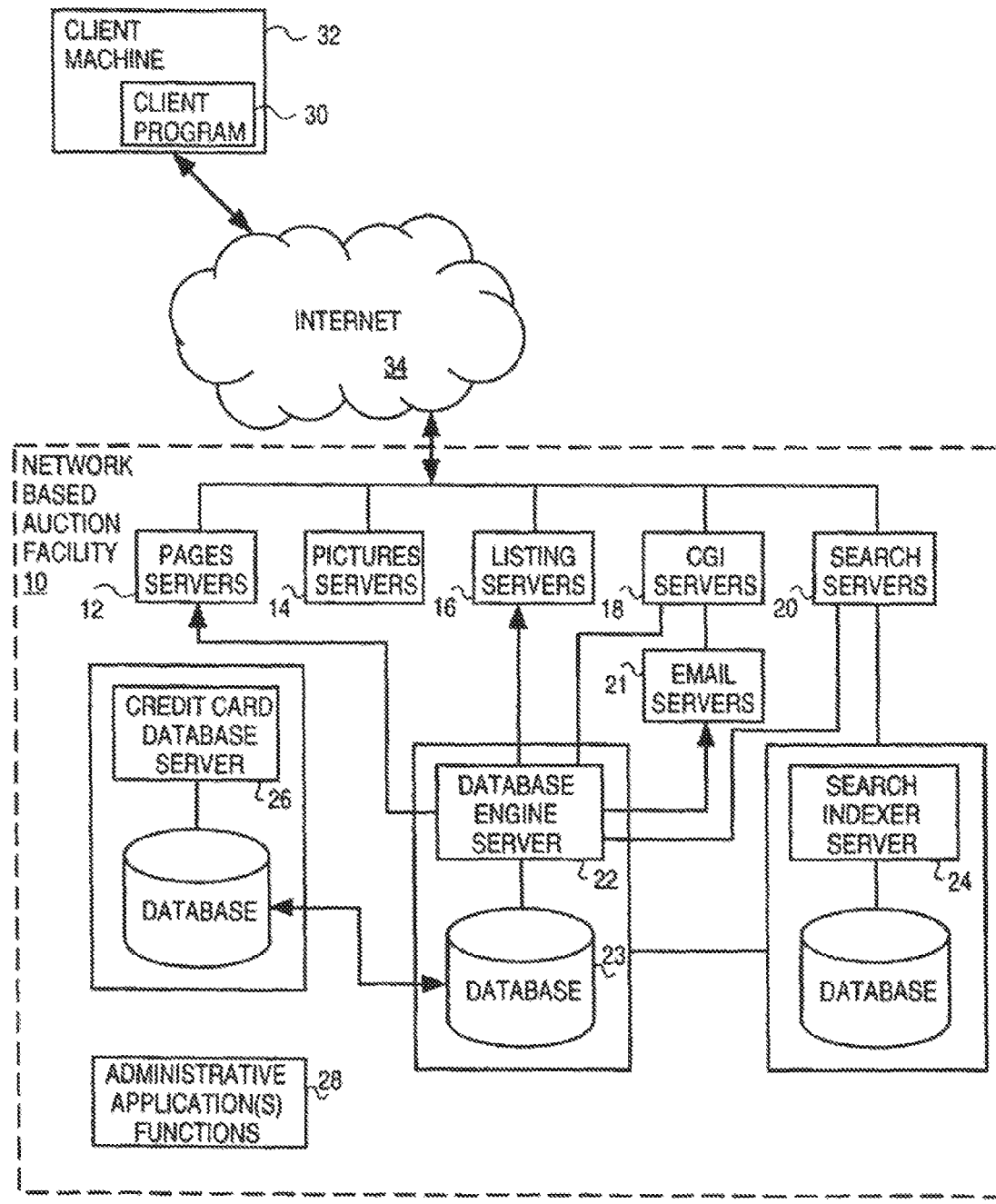
FIG. 1 is a block diagram of an exemplary web-based facility in the form of a network-based auction facility.

FIG. 1 is a block diagram illustrating an exemplary Web-based commerce facility in the form of a network-based auction facility 10. While an exemplary embodiment of the present invention is described within the context of an auction facility, it will be appreciated by those skilled in the art that the invention will find application in many different types of computer-based, and network-based, commerce facilities.

The auction facility 10 includes one or more of a number of types of front-end servers, namely page servers 12 that deliver web pages (e.g., markup language documents), picture servers 14 that dynamically deliver images to be displayed within Web pages, listing servers 16, CGI servers 18 that provide an intelligent interface to the back-end of facility 10, and search servers 20 that handle search requests to the facility 10. E-mail servers 21 provide, inter alia, automated e-mail communications to users of the facility 10.

The back-end services include a database engine server 22, a search index server 24 and a credit card database server 26, each of which maintains and facilitates access to a respective database. The back-end is also shown to include a number of administrative applications or functions 28 that are described in further detail below.

The network-based auction facility 10 may be accessed by a client program 30, such as a browser (e.g., the Internet Explorer distributed by Microsoft Corp. of Redmond, Wash.) that executes on a client machine 32 and accesses the facility 10 via a network such as, for example, the Internet 34.

Figure 2:
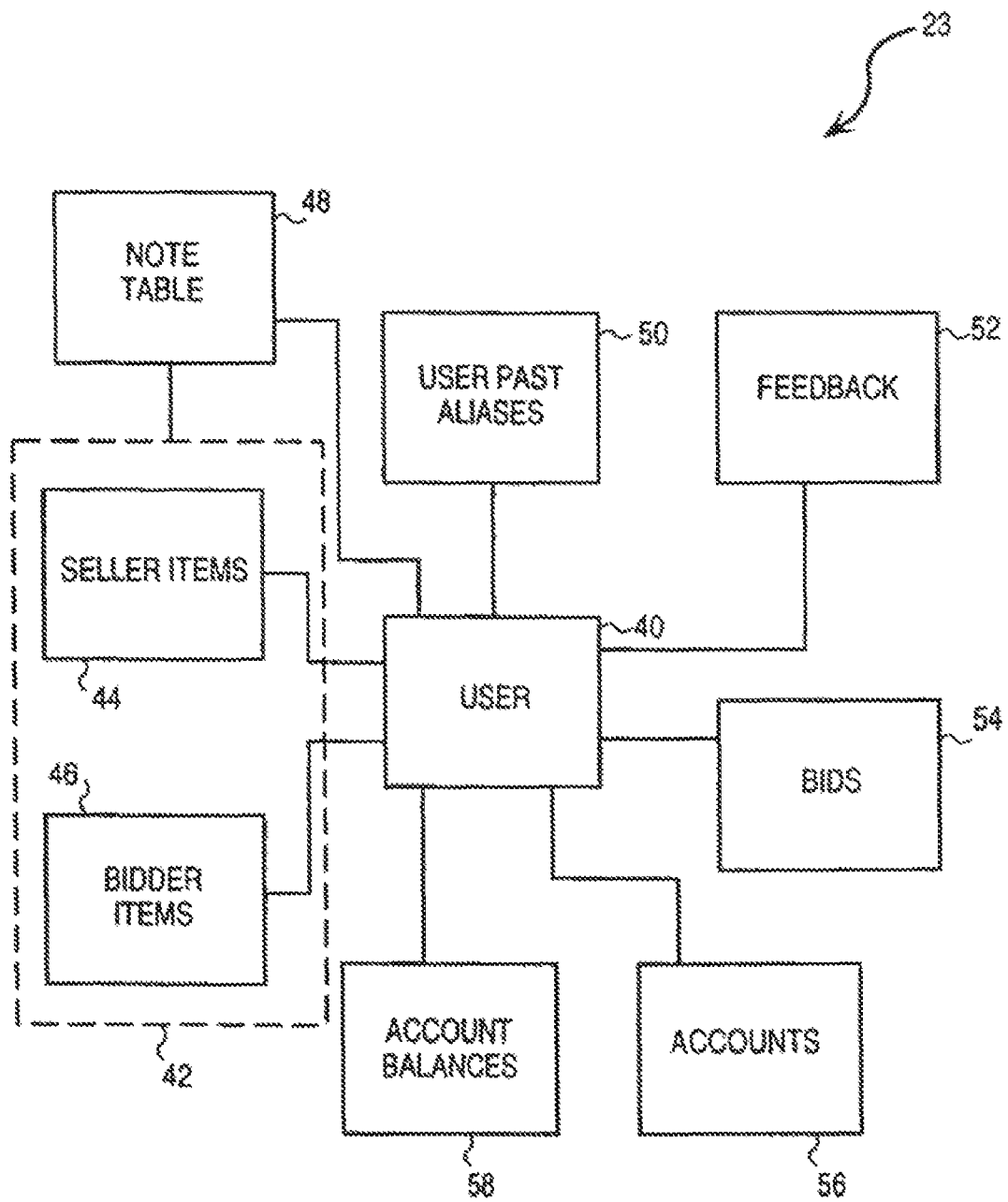
FIG. 2 is a database diagram illustrating an exemplary database, maintained by and accessed via a database engine server, that at least partially implements and supports the auction facility.

FIG. 2 is a database diagram illustrating an exemplary database 23, maintained by and accessed via the database engine server 22, that at least partially implements and supports the auction facility 10. The database 23 is a relational database, and includes a number of tables having entries, or records, that are linked by indices and keys. Central to the database 23 is a user table 40, which contains a record for each user of the auction facility 10. A user may operate as a seller, buyer, or both, within the auction facility 10. The database 23 also includes item tables 42 that may be linked to the user table 40. Specifically, the item tables 42 include a seller items table 44 and data items table 46. A user record in the user table 40 may be linked to multiple items that are being, or have been, auctioned via the facility 10, a link indicating whether the user is a seller or a bidder (or buyer) with respect to items for which records exist within in the item tables 42. The database 23 also includes a note table 48 populated with note records that may be linked to one or more item records within the item tables 42 and/or to one or more user records within the user table 40. Each note record within the table 48 may include, inter alia, a comment, description, history or other information pertaining to an item being auctioned via the auction facility 10, or to a user of the auction facility 10.

A number of other tables are also shown to be linked to the user table 40, namely a user past aliases table 50, a feedback table 52, a bids table 54, an accounts table 56, and an account balances table 58.

Figure 3:
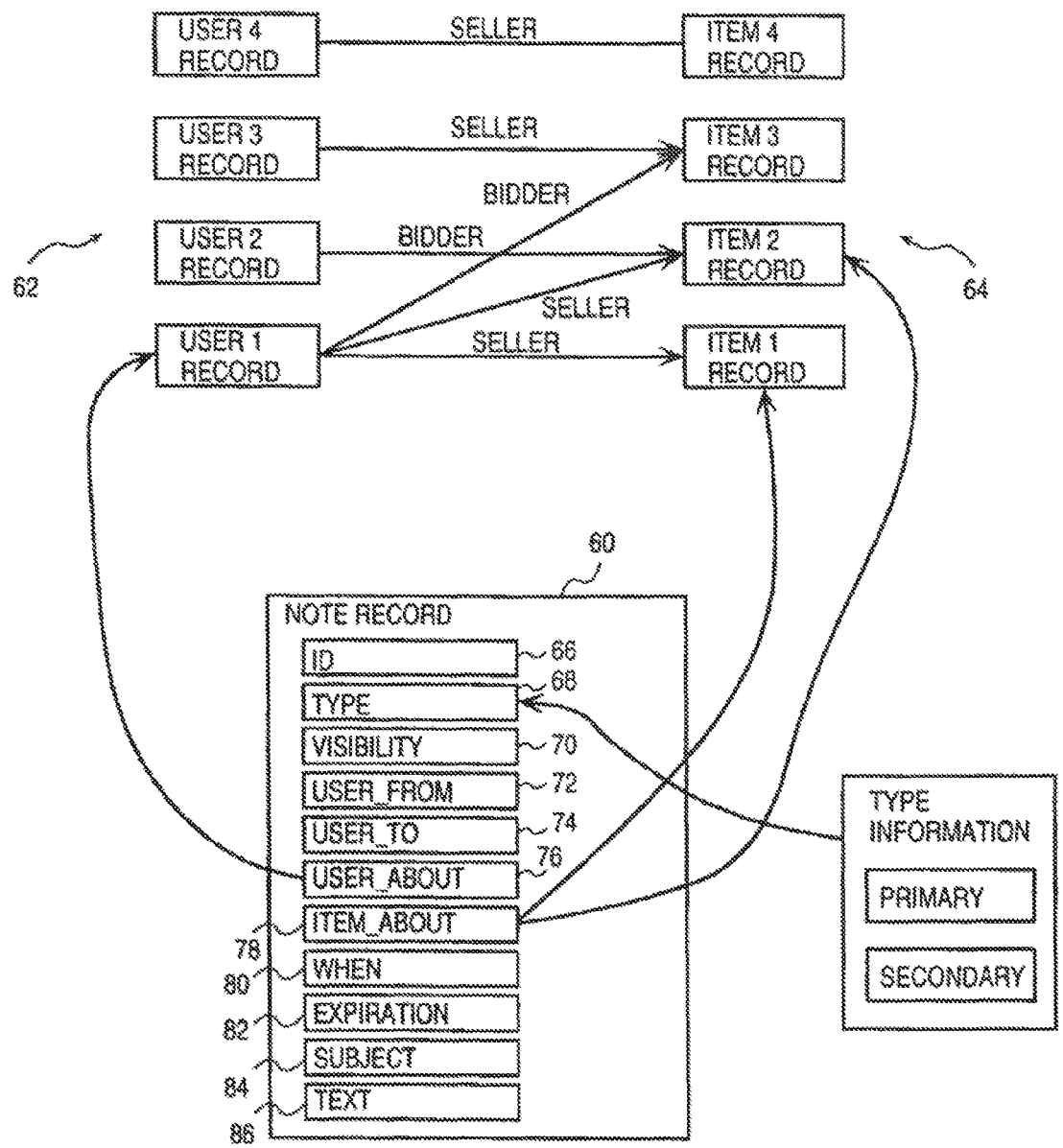
FIG. 3 is a diagrammatic representation of exemplary links between a note record in a note table and user records and item records in respective user and item tables.

FIG. 3 is a diagrammatic representation of exemplary links between a note record 60 in the note table 48, and user records 62 and item records 64 in the respective user table 40 and item tables 42. FIG. 3 also illustrates an exemplary structure, or fields, of the note record 60.

As described above with reference to FIG. 2, user records 62 may be linked to one or more item records, the links indicating whether the relevant user is a bidder or seller with respect to the relevant item or items. For example, in FIG. 3, the user 4 is shown to be a seller of item 4, while user 1 is shown to be the seller of items 1 and 2, and a bidder for item 3. Accordingly, a one-to-many mapping, or linkage, may occur between user records and item records, and the links may either be bidder or seller links.

The note record 60 is shown to include a number of fields, each of which is briefly discussed below:

1. An identification field 66: this field contains a numeric identification number for note record 60.
2. A type field 68: this field contains textual type information, which is selected from a predetermined set of message types that provides an indication of the reason for the creation of the note record 60. The predetermined set of message types may be presented, for example, to an administrator of the auction facility 10 for selection in the form of a drop-down menu of a user interface. The type information may furthermore constitute both primary and secondary type information, with the primary type information providing a broad type indication and the secondary type information providing a lower granularity of type information. As such, type information may be viewed as a "meta title" for a note record 60 that corresponds to common topics for notes. Examples of message types that may be included within the predetermined set of message types include: user suspended, user received temporary clearance, user received procedural warning, item ended because copyright/trademark violation, item ended because offensive material, etc.
3. A visibility field 70: this field contains alphanumeric visibility information indicating which, for example, administrators or level of administrator of the auction facility 10 have access to the relevant note record 60.
4. A "user_from" field 72: this field contains alphanumeric address information (or a key to such address information stored in the user table 40), indicating, for example, an address, or multiple addresses, of an administrator(s) that created the note record 60.
5. A "user_to" field 74: this field contains alphanumeric address information (or a key to such address information stored in the user table 40), indicating, for example, an address, or multiple addresses, of an administrator(s) to which the note record 60 is addressed or targeted.
6. A "user_about" field 76: this field contains alphanumeric address information (or a key to such address information stored in the user table 40) indicating the address of, for example, a user or participant of the auction facility 10 to which the relevant note record 60 may pertain. Such a participant may, it will be appreciated, be or have been either a bidder or a seller of items on the auction facility 10. FIG. 3 according illustrates this field as being linked, or keyed, to a user record 62 within the user table 40.
7. An "item_about" field 78: this field contains a key to an item record(s) 64 within the item tables 42, and accordingly identifies a particular item to which the note record 60 may pertain. In the exemplary embodiment, such items may include both physical products and services. The physical products may comprise a specialized category of products where the auction facility 10 is focused on such a specialized categories (e.g., www.art-.com) or a broad range of products where the auction facility 10 provides a more general marketplace (e.g., www.ebay.com).
8. A "when" field 80: this field contains data information indicating a date on which the relevant note record 60 was created.
9. An "expiration" field 82: this field contains date information indicating an expiration date on which the relevant note record 60 expires. The expiration data may, for example, be inputted by an administrator when creating the note record, and may specify a predetermined time period (e.g., one year) from the creation date at which the note record 60 is to expire.
10. A "subject" field 84: this structure field contains textual information that is selected from a dynamic list of well-known subjects by a creator of the note record 60. For example, the list of subjects may include: suspension, warning, billing warning, billing authorization, etc.
11. A "text" field 86: this field contains free-form text inputted the creator of the note record 60 that may provide further information regarding the relevant note.

Figure 4:
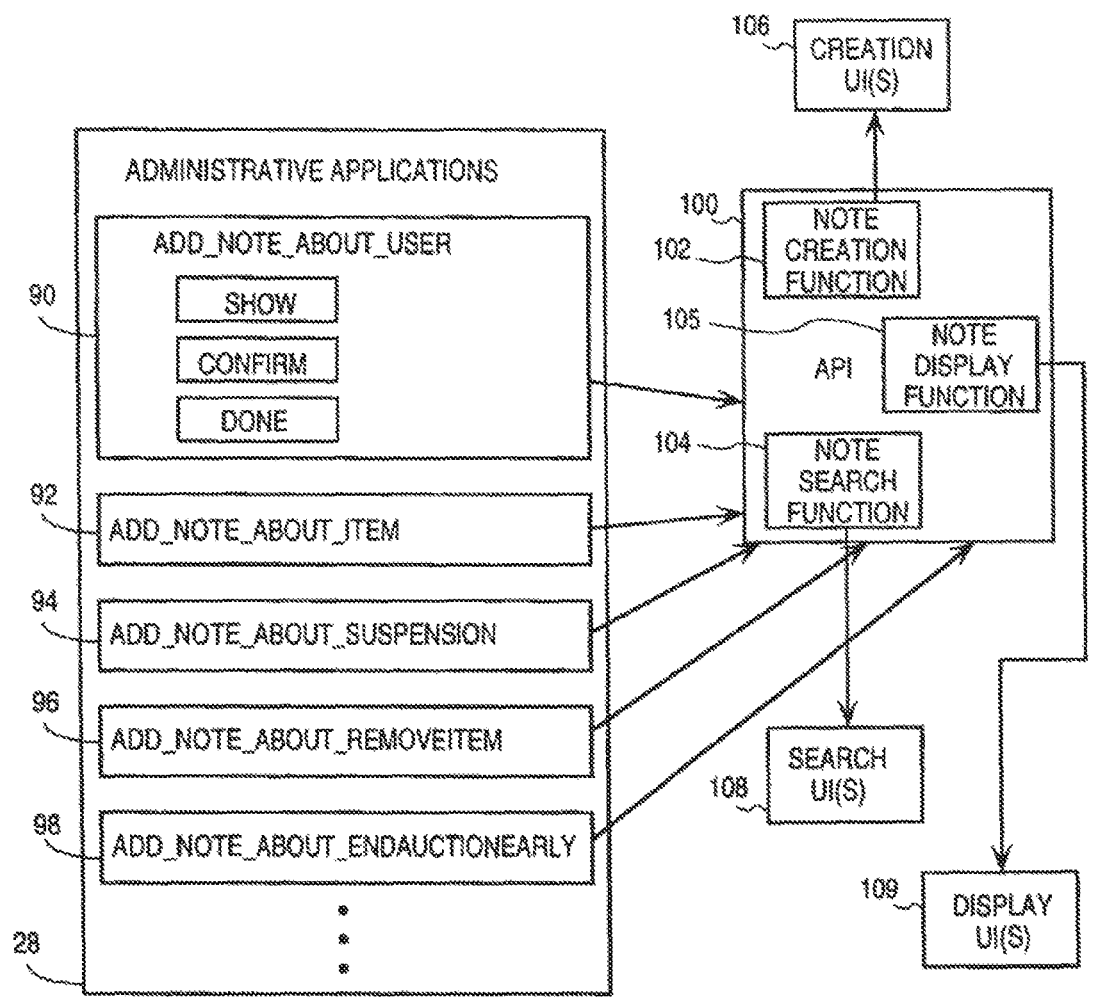
FIG. 4 is a diagrammatic representation of an architecture of exemplary applications and functions within an auction facility that facilitate the creation and display of notes represented by a note record.

FIG. 4 is a diagrammatic representation of the architecture of exemplary applications and functions within the auction facility 10 that facilitate the creation and display of notes represented by the note record 60. The auction facility 10 includes a number of administrative applications 28 that may be invoked by administrators of the auction facility 10 to facilitate convenient and user-friendly administration through the use of notes. Examples of the administrative applications include an "add_note_about_user" administrative application 90 that an administrator may invoke to generate a note concerning a participant and an "add_note_about_item" administrative application 92 that may be invoked to generate a note concerning an auction item. Further administrative applications 28 enable an administrator to create notes concerning, for example, the suspension of a user or item, the removal of an item that is up for auction on the auction facility 10, and the early ending of auction.

Each of the administrative applications 28 may call a note Application Program Interface (API) 100 that embodies a note creation function 102, a note search function 104, and a note display function 105. The note creation function 102 facilitates the storage of notes as note records 60 including the data elements, or fields, described above. The note creation function 102 also allows note records 60 to be removed individually, or in a batch utilizing other criteria. The note creation function 102 also, in turn, calls one or more note creation User Interfaces (UI's) 106 that each present a number of input fields, for example corresponding to the fields of a note record 60, via which a user (e.g., an administrator) can input information to populate the fields of a note record 60. As mentioned above, respective sets of type information and subject information may be presented by a creation UI 106 as drop-down menus. A creation UI 106 may also perform a validation, or authentication, function by requiring an administrator to input a user ID and password that are validated before creation of a note record 60 utilizing information supplied via the relevant creation UI 106. In one embodiment, a creation UI 106 may (1) display an HTML form (e.g., add note.HTML) that presents a number input fields, (2) perform a further validation operation of the user ID and password, as well as of other information that is being submitted (e.g., administrator or participant address information, subject information and type information), and (3) if the submitted information is all valid, communicate this information to the API 100 for storage as a note record 60 and display a confirmation screen to the relevant administrator. If the validation operation identifies any inputted information as being invalid or incorrect, this is communicated by the note creation UI 106 to the administrator.

The note search function 104 facilitates the searching of note records 60, within the note table 48, based on any one of a number of fields (e.g., administrator address or identifier, participant address or identifier, item number, type information, subject information, etc.). The note search function 104, in turn, may call one or more note search User Interfaces (UI's) 108 that present a number of input fields for specifying search criteria. As with the note creation UI's 106, the note search UI's 108 may perform a validation function by requiring an administrator to input a user ID and password that are validated before permitting a search operation. If the validation operation identifies any input information as being invalid or incorrect, this is communicated by the note search URI 108 to the searcher.

Figure 5:
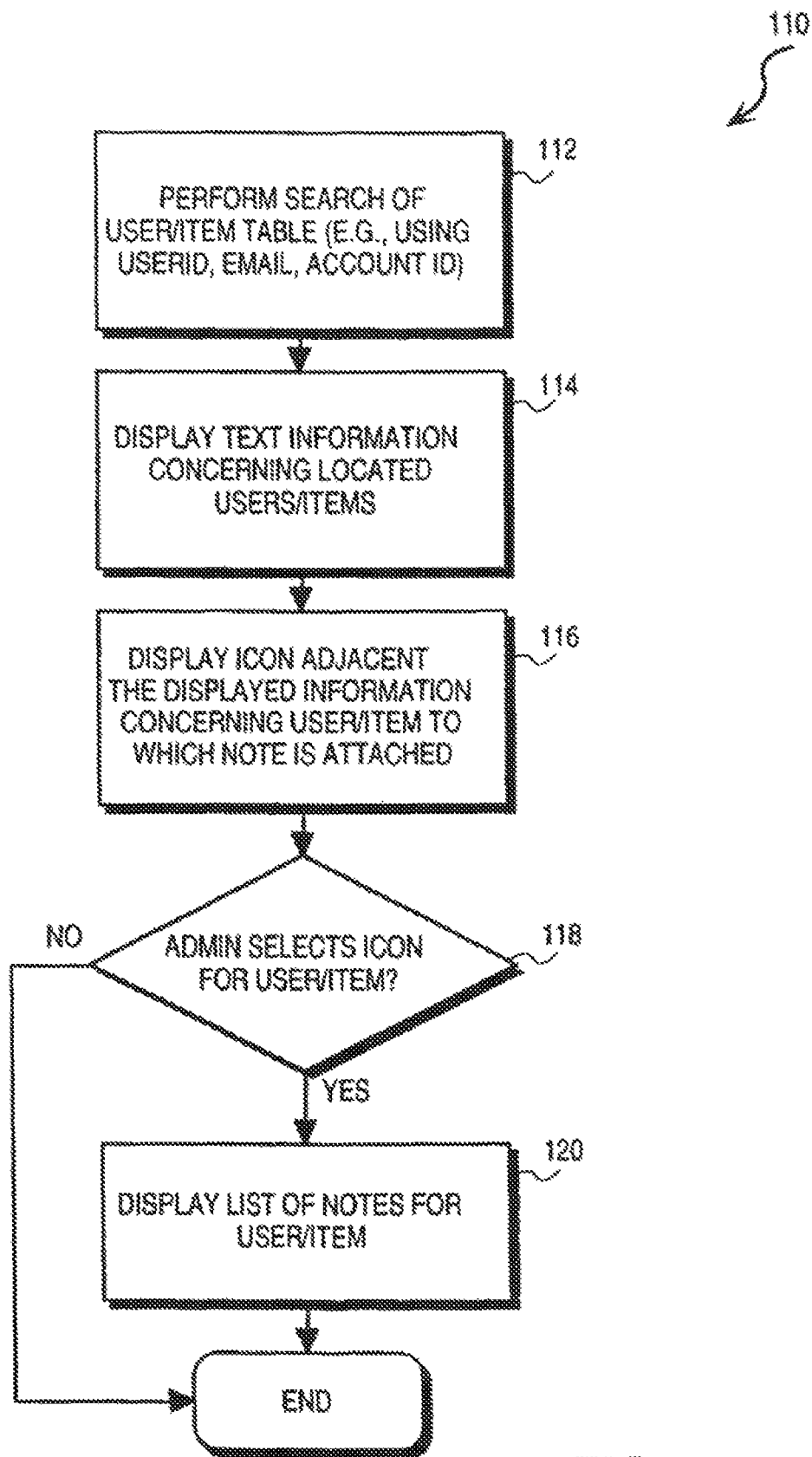
FIG. 5 is a flow chart illustrating an exemplary method, according to one embodiment of the present invention, of communicating information via a network-based commerce facility.

FIG. 5 is a flowchart illustrating an exemplary method 110 of communicating information within a network-based commerce facility, such as the auction facility 10. The method 110 commences at block 112 where a person or process (e.g., administrator) performs a search of the user table 40, or the item tables 42, for example utilizing the note search function 104. The administrator may conduct such a search with a view to suspending a participant for a violation of rules by which the auction facility 10 operates or to removing an item from auction, or simply to investigate a user or item. The search may be conducted on any one of the fields discussed above.

At block 114, the note search function 104, via the search UI 108, displays textual information concerning a participant or item located by the search. At block 116, the note search function 104, again via the search UI 108, displays a note icon adjacent the displayed textual information to indicate that at least one note, embodied within a note record 60, is associated with the located participant or item. In one embodiment, where the search URI 108 displays the results of the search as an HTML document, the note icon may have a Uniform Resource Locator (URL) associated therewith that specifies a web or directory path to a script (e.g., a CGI script) that invokes a note display function 105 embodied within the API 100.

The note icon may further be a static or dynamic image, graphic or text that is visually associated the displayed information.

At decision box 118, the note search UI 108 determines whether, for example, an administrator has selected the displayed note icon for the participant or item. For example, the search UI 108 may register a "click" or "double-click" operation performed by the administrator utilizing a cursor control device (e.g., a mouse). If so, at block 120, the method 110 displays a list of notes (or messages) for the located participant or item. As described above, user selection of the note icon, embedded in HTML document, may in one embodiment invoke a note display function 105 that retrieves all note records 60 for the located participant or item, and populates a note display UI 109 (e.g., HTML page) utilizing the retrieved note records 60.

The display of a note icon by the note search function 104 ensures that an administrator is presented with the option of retrieving notes, or messages, that administrators may have created with respect to a participant or item regardless of an original addressee of the note. As the note is associated with the subject thereof, as opposed to the addressor or addressee, it is ensured that any administrator accessing information concerning the subject (e.g., a participant or item) will be made aware of the existence of the note. Further, as the UI's may, in one embodiment, comprise markup language documents (e.g., HTML documents) that are viewable by a browser, traditional e-mail channels for communicating administrative notes may be avoided.

FIG. 6 illustrates an exemplary embodiment of an HTML page generated by the note search UI 108, and is shown to prompt a searcher (e.g., an administrator) for a search string in field 122, the search string for example comprising the user ID of a participant. The searcher is further prompted to select either an exact user ID (or e-mail) match or an account ID search.

FIG. 7 illustrates an exemplary embodiment of an HTML page generated by the note search UI 108 that provides certain information regarding a participant located by the search string into the field 122 of the search UI 108 shown in FIG. 6. An exemplary note icon 124, which is associated with a URL, is displayed adjacent the user ID of the located participant. The search UI 108 also displays an account balance (outstanding), and hypertext links to past and present auctions in which the participant participated as either a buyer or seller, to bids that the participant may have placed for items and to an alias history. The UI 108 also provides an indication whether the participant is a "top seller" within the auction facility 10. Finally, the UI 108 provides a number of user-selectable actions (e.g., reinstate) that invoke an administrative application 28, such as any of those discussed above with reference to FIG. 4.

FIG. 8 illustrates an exemplary embodiment of an HTML page generated by a creation UI 106 that allows a user, or an administrator, to reinstate a user of the auction facility 10, following a suspension. The UI 106 may, in one embodiment, interact with a reinstate function (not shown) that records the reinstating of a user and that interacts with a note creation function 102 to automatically create a note concerning the reinstatement within the note table 48. The UI 106 shown in FIG. 8 may be generated responsive to user selection of a "reinstate" hypertext link 126 shown in FIG. 7. The UI 106 presents a user ID field 130 into which the administrator enters an identifier or e-mail address, a password field 132 into which the administrator enters a password, a user field 134 into which the administrator enters a user ID or e-mail address concerning the user to be reinstated, a "warning reason" drop-down menu 136 that contains a predetermined set of reasons why a user of the auction facility 10 may be warned (e.g., a list of common infractions), and a text field 140 into which the administrator can input further information regarding the reinstatement. For example, the administrator may indicate that a case of mistaken identity caused the relevant user to be blocked or removed from the auction facility 10. The UI 106 also includes a "reinstate" button 142 that is user selectable to invoke a reinstate function, and a "clear form" button 144 that is user selectable to reset the contents of the fields 130-140.

FIG. 9 illustrates a further exemplary embodiment of an HTML page generated by the note search UI 108 that allows, for example, a user to perform a search specifically for notes regarding a participant or item of the auction facility 10. To this end, the exemplary UI 108 includes an "about" field 150 into which an administrator may enter a user ID, an e-mail address or an item number to identify either a participant or item number to identify either a participant or an item. Alternatively, the administrator may leave the field 150 blank so that the search results are not filtered according to participant or item.

A "note category" field 152 provides a drop-down menu of note categories that are user selectable to locate notes pertaining only to a specific category. For example, the drop-down menu presented within the field 152 may specify a "reinstate" category that is user selectable to identify notes pertaining to reinstatement actions formed by administrators. It will be appreciated that categories into which notes may be organized is dependent on the type of facility being administered, and also upon the design of the auction facility 10. Accordingly, a wide variety of categories could be presented for selection as input to the "note category" field 152.

Figure 10:
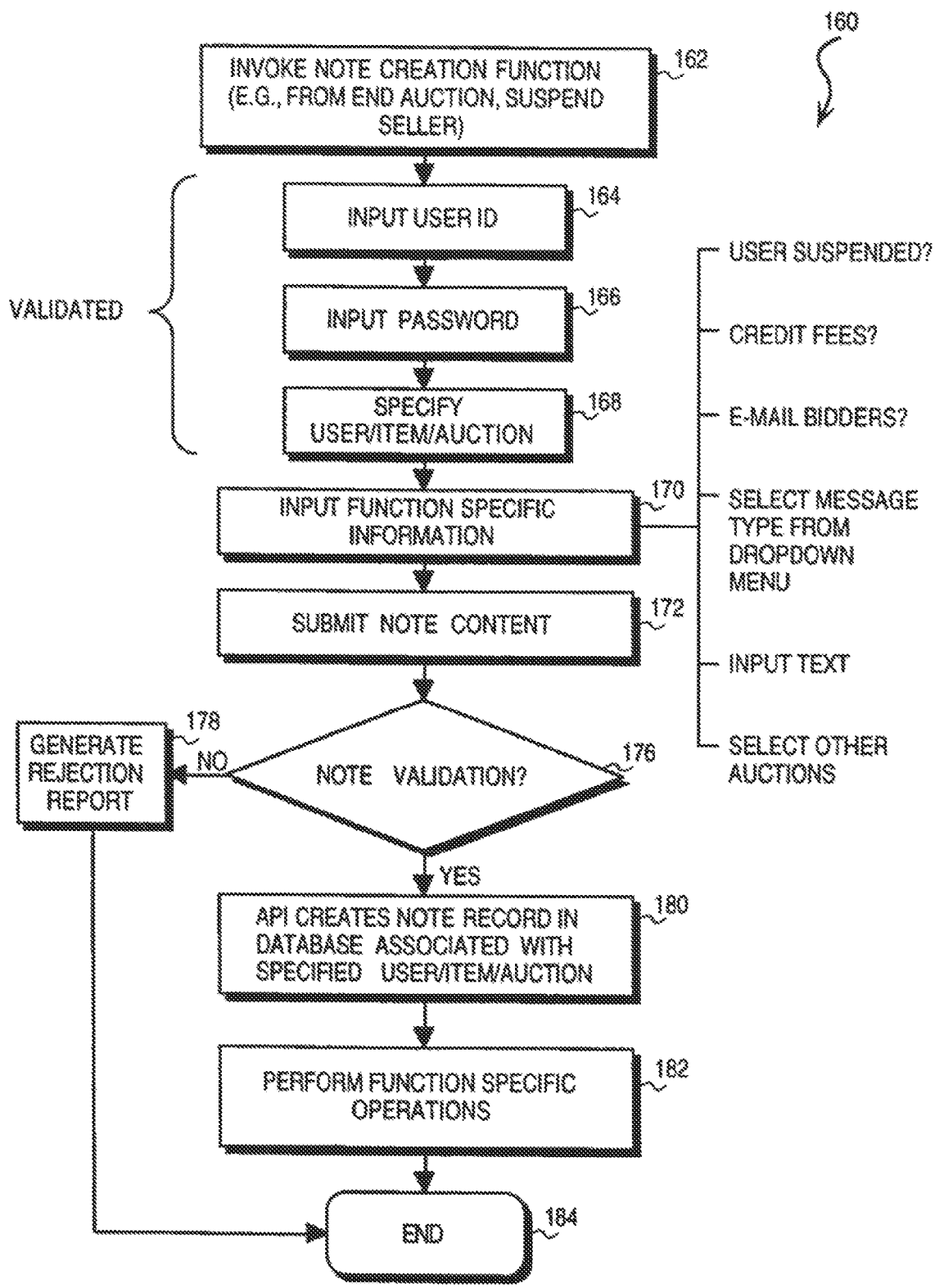
FIG. 10 is a flow chart illustrating an exemplary method of creating a note, represented by a note record, within a note table.

FIG. 10 is a flow chart illustrating an exemplary method 160 of creating a note, represented by a note record 60, within the note table 48. The method 160 commences with the invoking of the note creation function 102. The note creation function 102 may be invoked by a user via any one of a number of administrative interfaces (e.g., interfaces to end an auction, suspend the seller, reinstate a seller, etc.). Alternatively, the note creation function 102 may be invoked automatically by an automated administrative function that, merely for example, performs a housekeeping function with respect to the database 23. The note creation function 102 may also be invoked by a batch function that performs certain batch functions with respect to the database 23 (e.g., the pruning of inactive accounts, etc.). Examples of administrative applications that may invoke the note creation function 102 are provided in FIG. 4.

At block 164, the administrator inputs a user ID, or e-mail address. At block 166, the administrator inputs a password, and at block 168 the administrator specifies a user, item or auction to which the relevant note pertains. The information inputted at blocks 164, 166 and 168 is subject to a validation operation by the note creation function 102.

At block 170, the administrator may then input specific information relevant to the note. Merely for example, the administrator may specify whether a user is to be suspended, fees are to be credited to the seller, bidders on the auction are to be e-mailed regarding an auction, and what the message type is. The administrator may also input pertinent text information, and select further participants, items or auctions to which the note applies.

At block 172, the administrator then submits the note content via the API 100.

At decision block 176, a determination is made as to whether the note is valid by, for example, performing validation checks on the information inputted at blocks 164-172. If not, a rejection report is generated at block 178. Alternatively, at block 180, the API 100, and specifically the note creation function 102, creates a record in the database 23, and specifically within the note table 48, associated with the specified participant item or auction. At block 182, an administrative function that invoked the note creation function 102 may perform other function specific operations (e.g., marking a user record as being suspended or removing an item from the auction facility 10 to update the database 23). The method 160 then ends at block 184.

Figure 11A:
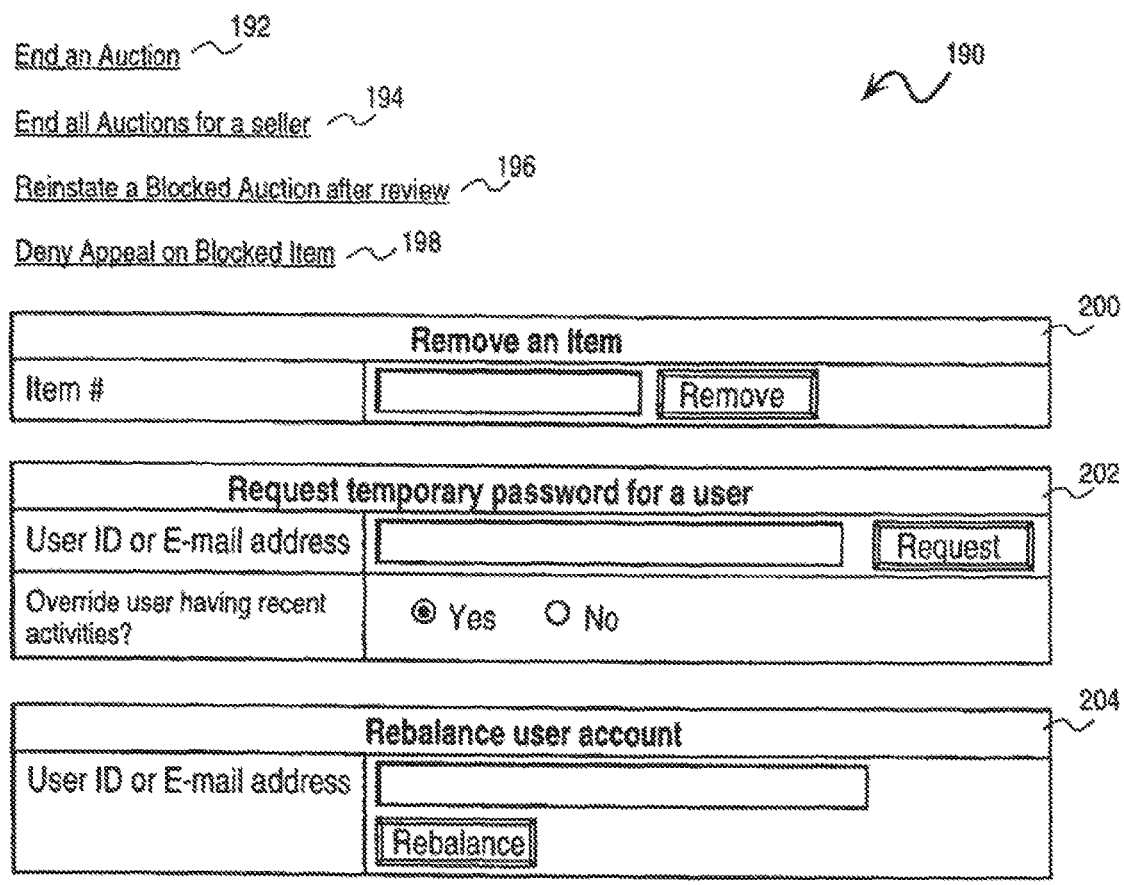

FIGS. 11A-11E show various exemplary UI's, in the form of HTML or other mark-up language pages, that may be presented to an administrator in the performance of the method 160. FIG. 11A shows an administrative application interface 190, utilizing which an administrator can select an administrative function to be performed. For example, via the interface 190, an administrator may select to end an auction, end all auctions for a seller, reinstate a blocked auction after review, deny appeal on a blocked item, remove an item, request a temporary password for a user, or rebalance a user account. These applications may be invoked by user selection of appropriate hypertext 192-204.

FIG. 11B illustrates an exemplary "end auction" UI 205, in the form of an HTML document, via which an administrator may be prompt for information regarding an auction, or multiple auction, to be ended. The UI 205 may be presented in response to user selection of the hypertext 192 illustrated in FIG. 11A.

The UI 205 includes a user ID field 206, a password field 208 and an "auctions to end" field 210. An administrator may enter the identification numbers or codes for auctions to be entered into the field 210. The administrator is further given the option to suspend a user, credit fees to a seller, and e-mail bidders on an auction by selection of the appropriate radio buttons in the fields 212, 214 and 216.

A "reason" field 218 includes a drop-down menu that presents a predetermined and authorized list of reasons for ending an auction for selection by the administrator. Finally, in the "text" field 220, an administrator may enter additional text or description regarding the ending of the relevant auction or auctions.

FIG. 11C illustrates an exemplary embodiment of an "end member's auctions" user interface 224, in the form of an HTML document, using which an administrator may end all auctions of a particular participant, member or user of the auction facility 10. The UI 224 is similar to the UI 205 shown in FIG. 11B, but differs in that an administrator may, via a "user ID" field 230 specifies the user ID, or e-mail address, of the user for which all auctions are to be ended. The UI 224 may, for example, be invoked by user selection of the hypertext 194 illustrated in FIG. 11A.

FIG. 11D illustrates an exemplary "reinstate auction" UI 240, in the form of an HTML document, utilizing which an administrator may specify that an auction be reinstated. The UI 240 includes an "auction to reinstate" file 242 into which an administrator may input the item number of the subject auction, or other identifying information. A "reason" field 244 presents a drop-down menu of a predetermined list of common or authorized reasons for reinstatement of an auction. The UI 240 may, merely for example, be invoked by user selection of the hypertext 196 illustrated in FIG. 11AB.

FIG. 11E illustrates an exemplary embodiment of an "appeal denied" UI 250, in the form of an HTML document, utilizing which an administrator can create a note as to why an appeal against the ending of an auction, or suspension of a user, was denied by the relevant administrator or by an appeal mechanism of the auction facility 10. The UI 250 represents a "blocked item" field 252, into which the administrator inputs an item number, or other identifier, to specify an auction. A "reason" field 254 presents a button on a menu of common, or authorized, reasons for the denial of an appeal.

Any of the UI's, or interfaces, discussed above may further include an "expiration" field, into which an administrator may input a time period within which, or date by which, a relevant note will expire. This information may then populate the expiration field 82 of a note record 60. In a further embodiment, the expiration field 82 may be automatically populated by a housekeeping function.

Figure 12:
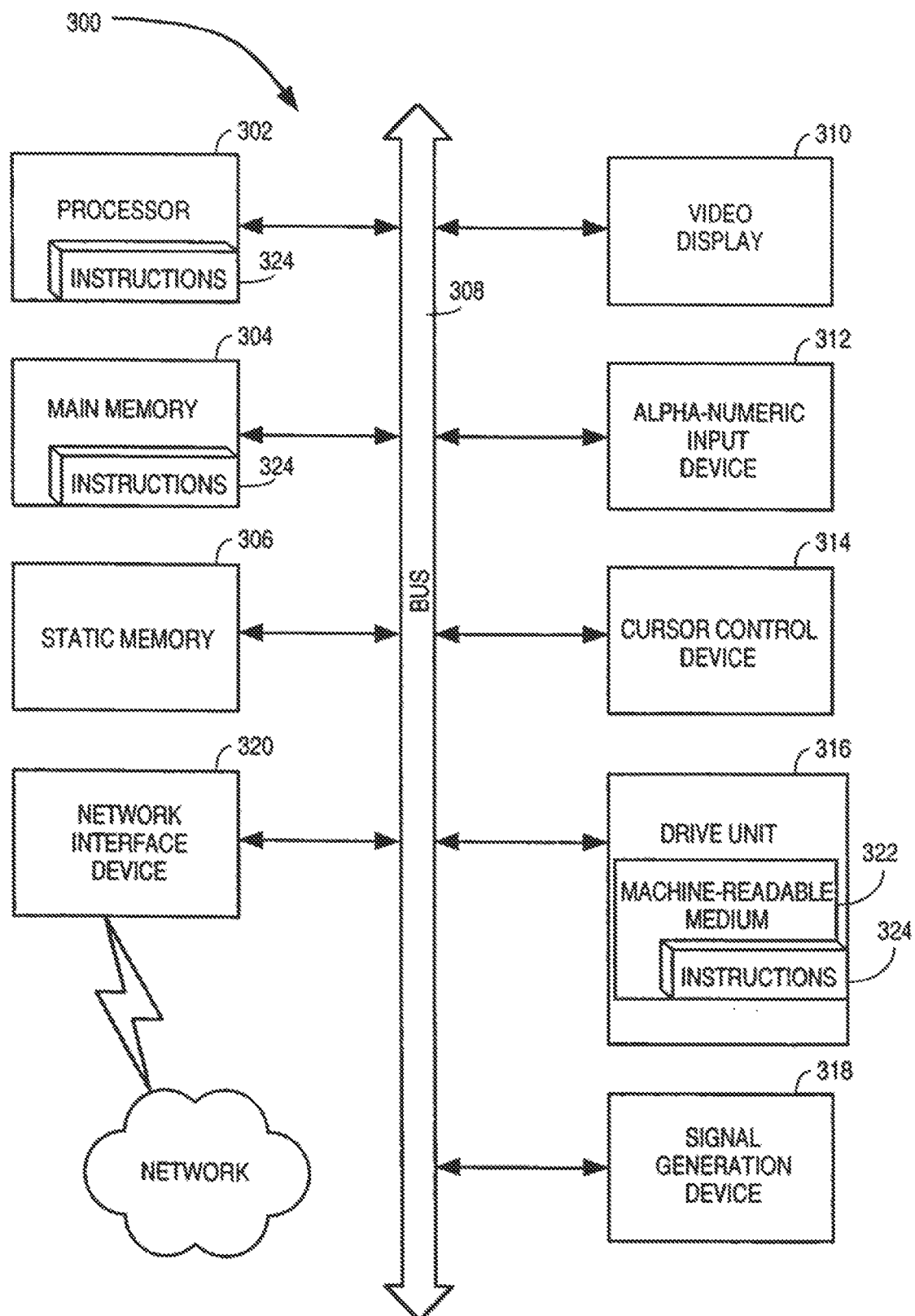
FIG. 12 is a diagrammatic representation of a machine in the exemplary form of a computer system within which a set of instructions, for causing the machine to perform any of the methodologies discussed herein, may be executed.

FIG. 12 shows a diagrammatic representation of machine in the exemplary form of a computer system 300 within which a set of instructions, for causing the machine to perform any one of the methodologies discussed above, may be executed. In alternative embodiments, the machine may comprise a network router, a network switch, a network bridge, Personal Digital Assistant (PDA), a cellular telephone, a web appliance or any machine capable of executing a sequence of instructions that specify actions to be taken by that machine.

The computer system 300 includes a processor 302, a main memory 304 and a static memory 306, which communicate with each other via a bus 308. The computer system 300 may further include a video display unit 310 (e.g., a liquid crystal display (LCD) or a cathode ray tube (CRT)). The computer system 300 also includes an alpha-numeric input device 312 (e.g. a keyboard), a cursor control device 314 (e.g. a mouse), a disk drive unit 316, a signal generation device 318 (e.g. a speaker) and a network interface device 320.

The disk drive unit 316 includes a machine-readable medium 322 on which is stored a set of instructions (i.e., software) 324 embodying any one, or all, of the methodologies described above. The software 324 is also shown to reside, completely or at least partially, within the main memory 304 and/or within the processor 302. The software 324 may further be transmitted or received via the network interface device 320. For the purposes of this specification, the term "machine-readable medium" shall be taken to include any medium which is capable of storing or encoding a sequence of instructions for execution by the machine and that cause the machine to perform any one of the methodologies of the present invention. The term "machine-readable medium" shall accordingly be taken to included, but not be limited to, solid-state memories, optical and magnetic disks, and carrier wave signals.

Thus, a method and system for communicating information within a network-based auction facility have been described. Although the present invention has been described with reference to specific exemplary embodiments, it will be evident that various modifications and changes may be made to these embodiments without departing from the broader spirit and scope of the invention. Accordingly, the specification and drawings are to be regarded in an illustrative rather than a restrictive sense.

The invention claimed is:

1. In a networked-based facility, a computer-implemented administration method comprising:
   receiving selection of a plurality of entities in the network-based facility from an administrator;
   receiving selection of an action from the administrator, wherein the selected action includes associating an administrative note with an entity; and
   applying, using one or more processors, the selected action to an electronic representation of each entity in the plurality of entities.

2. The method of claim 1, wherein applying the selected action includes invoking an administrative application to perform the selected action on the selected entities.

3. The method of claim 1, wherein the plurality of entities include a user account of the network-based facility.

4. The method of claim 1, wherein the plurality of entities include an item offered for auction via the network-based facility.

5. The method of claim 1, wherein the plurality of entities include an item listing being offered by auction via the network-based facility.

6. The method of claim 5, wherein the selected action is to end the auction of the item listing.

7. The method of claim 1, wherein the plurality of entities include an administrative note associated with the network-based facility.

8. The method of claim 7, wherein the selected action is to remove the administrative note.

9. The method of claim 1, wherein receiving selection of a plurality of entities includes prompting the administrator, via a user interface, to enter a list of entities.

10. The method of claim 1, wherein receiving selection of an action includes prompting the administrator, via a user interface, to select the action from a set of pre-defined actions for the plurality of entities.

11. A system including:
   a computing device; and
   an administrative application, executing on the computing device, the administrative application configured to:
      receive selection of a plurality of entities in a network-based facility from an administrator;
      receive selection of an action from the administrator, wherein the selected action includes associating an administrative note with an entity; and
      apply the selected action to an electronic representation of each entity in plurality of entities.

12. The system of claim 11, wherein to apply the selected action includes invoking an administrative application to perform the action on the selected entities.

13. The system of claim 11, wherein the plurality of entities include a user account of the network-based facility.

14. The system of claim 11, wherein the plurality of entities include an item offered for auction via the network-based facility.

15. The system of claim 11, wherein the plurality of entities include an item listing being offered by auction via the network-based facility.

16. The system of claim 15, wherein the selected action is to end the auction of the item listing.

17. The system of claim 11, wherein the plurality of entities include an administrative note associated with the network-based facility.

18. The system of claim 17, wherein the selected action is to remove the administrative note.

19. The system of claim 11, wherein to receive selection of a plurality of entities includes prompting the administrator, via a user interface, to enter a list of entities.

20. The system of claim 11, wherein to receive selection of an action includes prompting the administrator, via a user interface, to select the action from a set of pre-defined actions for the plurality of entities.

21. A non-transitory tangible machine-readable medium embodying instructions, which when executed by a machine, cause the machine to perform a method including:
   receiving selection of a plurality of entities in the network-based facility from an administrator;
   receiving selection of an action from the administrator, wherein the selected action includes associating an administrative note with an entity; and
   applying the selected action to an electronic representation of each entity in the plurality of entities.

* * * * *

UNITED STATES PATENT AND TRADEMARK OFFICE
CERTIFICATE OF CORRECTION

PATENT NO.       : 8,050,981 B2
APPLICATION NO.  : 12/833586
DATED            : November 1, 2011
INVENTOR(S)      : Michael K. Wilson It is certified that error appears in the above-identified patent and that said Letters Patent is hereby corrected as shown below:

On the cover page, item (63), in "Related U.S. Application Data", in column 1, lines 1-2, delete "Continuation of application No. 11/581,893 filed Oct. 17, 2006 now Pat. No. 7,756,776." and insert -- Continuation of application No. 11/581,893 filed Oct. 17, 2006 now Pat. No. 7,756,776, which claims priority from U.S. patent application Ser. No. 09/747,204 filed Dec. 21, 2000, which claims priority from U.S. Provisional Application Ser. No. 60/171,821 filed Dec. 21, 1999 and from U.S. Provisional Application Ser. No. 60/178,122 filed Jan. 26, 2000, which applications are herein incorporated by reference. --, therefor.

On page 2, under "Other Publications", in column 2, line 47, delete "Program"IBM" and insert -- Program", IBM --, therefor.

On page 2, under "Other Publications", in column 2, line 54, delete "39(3) ,(Mar." and insert -- 39(3), (Mar. --, therefor.

On page 2, under "Other Publications", in column 2, line 60, delete ""AUCNET;" and insert -- "AUCNET: --, therefor.

On page 2, under "Other Publications", in column 2, lines 60-62, delete "Transactions" Focus" and insert -- Transactions", Focus --, therefor.

On page 2, under "Other Publications", in column 2, line 63, delete ""Eiectronic" and insert -- "Electronic --, therefor.

On page 3, under "Other Publications", in column 1, line 2, delete "50(1)." and insert -- 50(1), --, therefor.

On page 3, under "Other Publications", in column 2, line 5, delete "vol," and insert -- vol. --, therefor.

Signed and Sealed this
Seventh Day of August, 2012

David J. Kappos
*Director of the United States Patent and Trademark Office*

CERTIFICATE OF CORRECTION (continued)
U.S. Pat. No. 8,050,981 B2

On page 3, under "Other Publications", in column 2, line 7, delete "No.9-10," and insert -- No. 9-10, --, therefor.

In the drawings: On Sheet 7 of 16, Figure 7, line 2, delete "Auctins" and insert -- Auctions --, therefor.

In the drawings: On Sheet 9 of 16, Figure 9, line 2, before "view" delete "to".

In the drawings: On Sheet 9 of 16, Figure 9, line 3, delete "an" and insert -- a --, therefor.

In the drawings: On Sheet 13 of 16, Box 230, Figure 11C, line 2, delete "auctins" and insert -- auctions --, therefor.

In the drawings: On Sheet 13 of 16, Box 220, Figure 11C, line 2, delete "(repuired)" and insert -- (required) --, therefor.

In the drawings: On Sheet 14 of 16, Box 220, Figure 11D, line 2, delete "(repuired)" and insert -- (required) --, therefor.

In the drawings: On Sheet 15 of 16, Box 220, Figure 11E, line 2, delete "(repuired)" and insert -- (required) --, therefor.

In column 7, line 13, after "or" delete "item number to identify either a participant or".

In column 10, line 27, in Claim 11, after "in" insert -- the --.